United States Patent

Kumagai et al.

[15] 3,663,761

[45] May 16, 1972

[54] TIME DIVISION MULTIPLEX TRANSMISSION SYSTEM

[72] Inventors: Denroku Kumagai; Yutaka Kurahashi, both of Tokyo, Japan

[73] Assignee: Nippon Telegraph and Telephone Public Corporation, Tokyo, Japan

[22] Filed: Aug. 5, 1969

[21] Appl. No.: 852,528

Related U.S. Application Data

[63] Continuation-in-part of Ser. No. 470,138, July 10, 1965, abandoned.

[30] Foreign Application Priority Data

July 10, 1964 Japan..................................39/39641

[52] U.S. Cl...........................................................179/15 AT

[51] Int. Cl...........................................................H04j 3/00

[58] Field of Search ..........179/15 AT, 15 BA, 15 BV, 15 BD

[56] References Cited

UNITED STATES PATENTS

| | | | |
|---|---|---|---|
| 3,165,588 | 1/1965 | Holzer | 179/15 BD |
| 3,437,755 | 4/1969 | Brown | 179/15 BV |
| 3,441,674 | 4/1969 | Giordano | 179/15 BV |

*Primary Examiner*—Ralph D. Blakeslee
*Attorney*—Watson, Cole, Grindle & Watson

[57] ABSTRACT

A multiplex transmission device includes pulse timing generating apparatus for generating channel sampling pulses and group sampling pulses whereby the time slots of the lowest frequency group at the input are successively divided to provide higher ordered groups of information at higher frequencies. A repeater station for combining and dropping groups or portions of groups of PCM signals in a multi-channel time division multiplex transmission system provides circuitry for generating timing control signals from groups of the multiplex signals to delay and/or inhibit select portions of selected information groups to either combine or drop selected information therein from the transmitted signal groups. The control circuitry utilizes either feed forward or feedback techniques.

7 Claims, 14 Drawing Figures

INVENTORS
Denroku Kumagai
Yutaka Kurahashi

BY
Watson, Cole, Grindle & Watson
ATTORNEYS

INVENTORS
Denroku Kumaga
Yutaka Kurahashi
BY
Watson, Cole, Grindle & Watson
ATTORNEYS Patented May 16, 1972 3,663,761
9 Sheets-Sheet 3

INVENTORS
Denroku Kumagai
Yutaka Kurahashi
BY
Watson, Cole, Grindle & Watson
ATTORNEYS

INVENTORS

Denroku Kumagai

Yutaka Kurahashi

BY

Watson, Cole, Grindle & Watson

ATTORNEYS

INVENTORS
Denroku Kumagai
Yutaka Kurahashi

BY
Watson, Cole, Grindle & Watson
ATTORNEYS

INVENTORS
Denroku Kumagai
Yutaka Kurohashi
BY
Watson, Cole, Grindle & Watson
ATTORNEYS INVENTORS
Denroku Kumagai
Yutaka Kurahashi
BY
Watson, Cole, Grindle & Watson
ATTORNEYS INVENTORS
Denroku Kumagai
Yutaka Kurahashi
BY
Watson, Cole, Grindle & Watson
ATTORNEYS

DENROKU KUMAGAI
KURAHASHI YUTAKA

INVENTORS

BY Watson, Cole, Grindle & Watson

ATTORNEY

TIME DIVISION MULTIPLEX TRANSMISSION SYSTEM

This Application is a Continuation-in-Part of Application Ser. No. 470,138, filed July 10, 1965 and now abandoned.

This invention relates to time division multiplex transmission systems and, in particular, to a PCM time division multiplex system for transmitting information from a number of voice channels wherein selected portions of data from groups of multiplex signals may be added and/or dropped from the transmitted data.

The high quality, relatively low complexity and high flexibility of a PCM system make it an excellent means for multiplexing appropriately sampled information from a number of voice input channels. In a conventional PCM multiplexing system the input voice signals are sampled by narrow channel timing pulses and then coded. This requires a high operating speed for the channel timing circuits and channel pulse circuits because there will be as many channel timing pulses required as there are channels of information to be multiplexed. Consequently, in a system involving a large number of input channels the apparatus necessary to achieve the multiplexing of the information will be quite complex. Furthermore, in a conventional PCM system, there is a decrease in the signal-to-noise ratio because of the low duty factor, which results in increased probability of transmission errors. The complexity of a conventional PCM multiplexing system detracts from its inherent flexibility for the addition and dropping of voice channels to any given multiplexed group within the system, and yet such flexibility is indispensable to the operation of such a communication network.

So-called asynchronous systems are known wherein transmitted digital information is translated to a voice frequency at terminals where information groups are either added to or dropped from the transmitted data. However, in such systems the translating equipment is expensive, complex and the reliability is considerably reduced because of the increase in quantizing noise caused by the coding and decoding of the information. Time division multiplexing transmission systems must have the capability of switching transmission lines in the event of a line failure or abnormal traffic load in the system. In an FDM (Frequency Division Multiplex) system, such abnormal conditions of the transmission network are detected by monitoring the pilot current of each system and switching the transmission line link-by-link by a suitable switching element located in the circuitry handling a basic or master information group of information. However, such detection and switching systems require a considerable time lag between the time a failure or overload condition is detected and the time when the appropriate switching function can be carried out by transmitting supervisory and controlling function information. Furthermore, since group identification information must be translated prior to switching the information itself, there is a considerable increase in the noise generated and, consequently, the circuit reliability is reduced. In order to compensate for this disadvantage, the requirements for the characteristics of the band-pass filters used in the system become so stringent that their design and production become extremely difficult.

An object of the present invention is to provide an improved PCM time division multiplexing communication system wherein the various defects described above are eliminated.

A second object of the invention is to provide means for dropping and/or adding signal data directly in digital form in a PCM time division multiplexing system to provide an improved transmission system.

Another object of the invention is to provide a means in a time division multiplex systems of the type described herein whereby the information in the various voice channels may be switched in the event of a failure or abnormally heavy traffic in the system.

The present invention represents an improvement in a PCM time division multiplex system wherein the time slots in each channel are uniformly or non-uniformly divided to provide an assignment for the data digits.

According to the present invention, there is provided a PCM time division multiplex communication system having a number of communication channels and a plurality of repeater stations each having terminal equipment which comprises a timing pulse generating means for producing coded digit timing pulses; means for producing group timing pulses for respective groupings of the multiplexed information included a large or master multiplexed group stage and successively smaller multiplexed group stages; means for generating channel timing pulses by dividing the frequency of a master clock by stages in accordance with the number of multiplex channels; a channel sampling circuit whereby each channel signal is sampled to form a PAM waveform; a group sampling circuit for each of the orders of multiplexed groups previously mentioned whereby PAM pulses from a respectively smaller group are sub-sampled at higher frequencies to form higher frequency PAM pulses; and a coder for sampling respective input voice frequency signals by means of the aforementioned channel timing pulses and for assembling outputs from the PAM time division multiplexed signals wherein the output signals are repeatedly sampled and assembled in stages by means of the aforementioned group timing pulses at successively higher frequencies and then coded for transmission.

Furthermore, in accordance with the invention, the repeater stations include circuitry for adding selected information from a lower ordered multiplexed group into a higher ordered multiplexed group and circuitry for dropping selected information from a higher ordered multiplexed group. The adding circuitry may incorporate either feedback or feed forward techniques. Both the adding and dropping circuits include timing and framing circuitry to provide the necessary time coincidence of the pulsed information in both the higher ordered and lower ordered multiplexed groups. Inhibit gates operated by pulse timing information ensure that information is not added or dropped when an out-of-frame situation occurs.

In order that the invention may be more clearly understood and practiced, a preferred embodiment thereof will now be described by way of example with reference to the accompanying drawings, in which.

Figure 1:
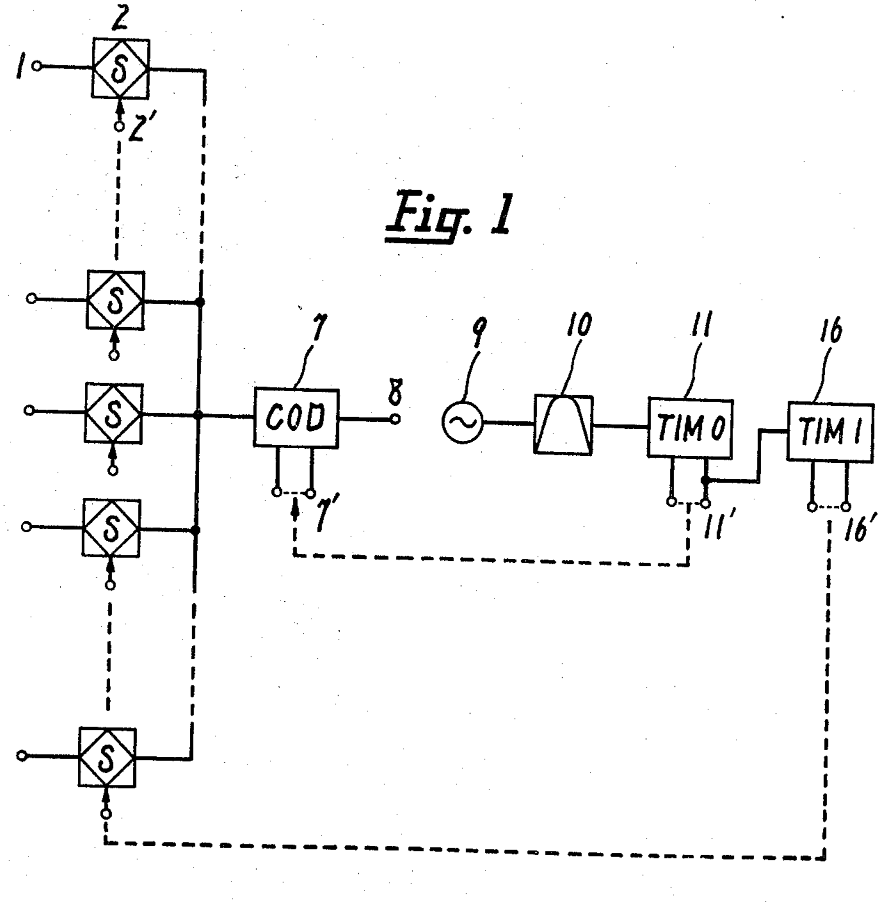
FIG. 1 illustrates a conventional PCM time division multiplex system.

The conventional PCM time multiplexing system, illustrated in FIG. 1, provides input voice signals at a terminal 1 of sampling circuit 2 so that the input signals may be directly sampled by narrow channel timing pulses provided at terminal 2' of the sampling circuit. The plurality of sampled signals are then coded in coder 7 in accordance with the pulse timing signals at terminals 7'. The PCM signals at output 8 are then transmitted in a well-known manner. Timing pulses for the coder and the sampling circuits are generated by master oscillator 9, pulse shaper 10, digit timing pulse generator 11, and channel timing pulse generator 16 in a manner known to those skilled in the art to which this invention pertains.

Figure 2:
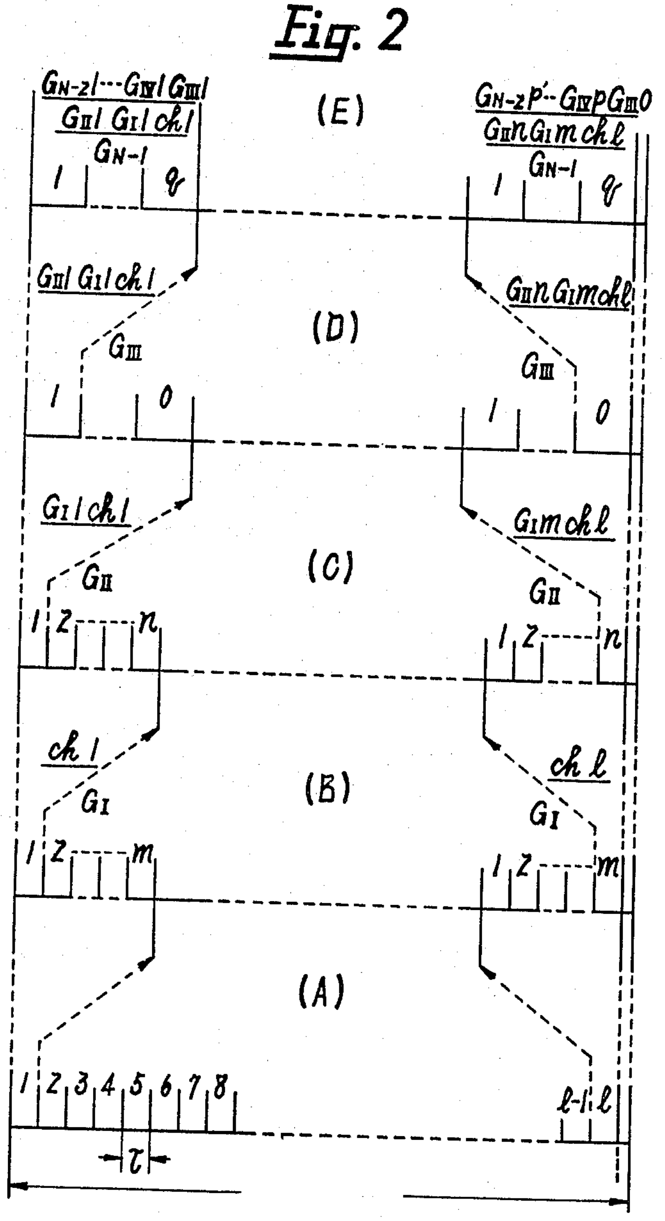
FIG. 2 is a time chart illustrating the respective time slot assignments within a PCM time division multiplexed group in accordance with the invention.

FIG. 2 illustrates an example of the manner in which channels are grouped into higher successive order groups. Each channel, as indicated by (A) is assigned a time slot *t*. The various channels or time slots of (A) are subdivided into respectively smaller time slots 1, 2 . . .*m* as indicated at (b) to form the first order group $G_I$. Each of the time slots of group 1 are divided into successively smaller time slots 1, 2 . . . *n* to form group $G_{II}$ as indicated at (C). The successive dividing of the time slots is continued to form groups $G_{III}$, $G_N$ – Cl, etc. as indicated respectively at (D) and (E). Thus, a single channel, which occupies a given time slot at (A) is successively divided in succeeding group orders into more finely divided time slots. FIG. 2 provides an example of channel time slot division which is uniform; however, non-uniform time division may also be used as is discussed more fully hereinafter.

Figure 3:
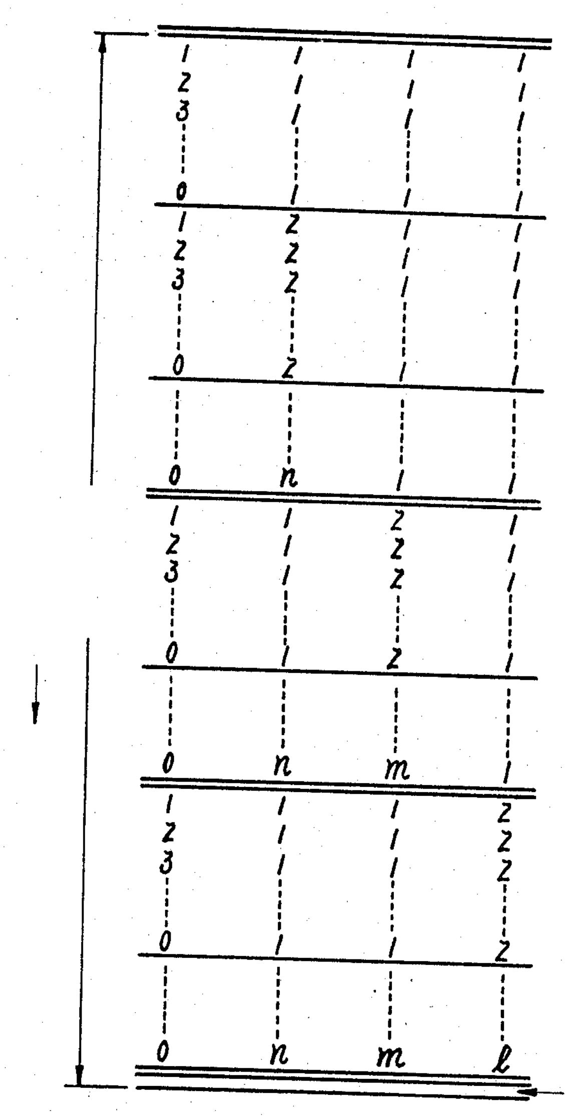
FIG. 3 is a time chart of the time slot assignments for a IVth order group formation.

FIG. 3 illustrates the manner in which channel time slots may be uniformly divided so as form a IVth order group, for example.

Figure 4:
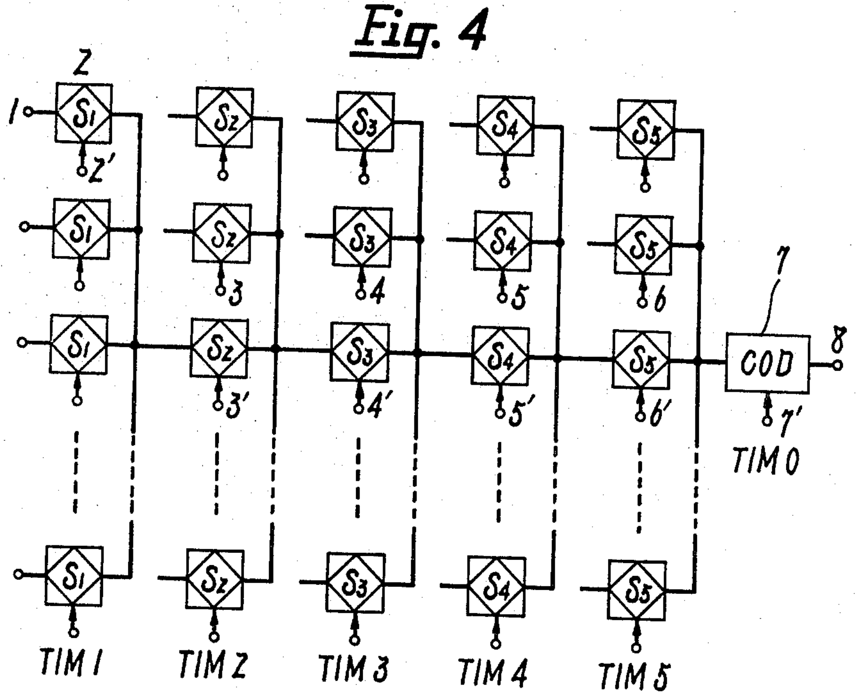
FIG. 4 is a block diagram representation of an information path for a transmitter.
Figure 5:
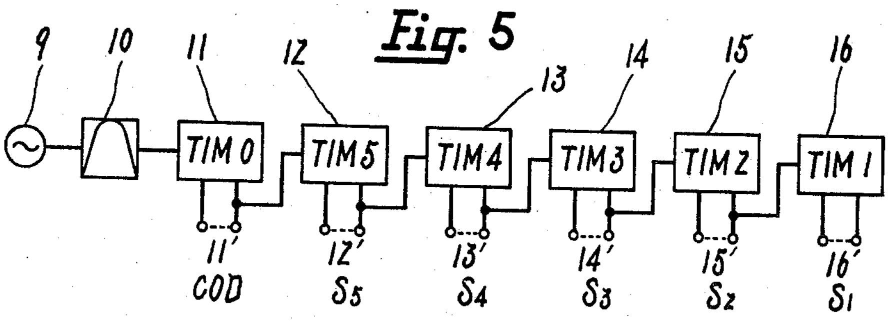
FIG. 5 illustrates in block diagram format a timing pulse generating circuit.

FIGS. 4 and 5 illustrate the circuits for a transmitting terminal in order to realize the group frame construction described above. The same numeral designations for the same circuitry are used throughout the Figures. Thus, the voice input terminals are designated by 1; the channel sampling circuits are designated by 2; 2' indicates the input terminal for the channel timing pulses for the first order group, and numerals 3, 4, 5, 6, etc. represent sampling circuits of the second, third, fourth, . . . N Nth order groups, respectively.

With respect to FIG. 5, the shaped output pulses from pulse shaper 10 and master oscillator 9 are provided to digit timing pulse generator 11. The output of pulse generator 11, as previously described with respect to FIG. 1, is applied to coding circuit 7. Timing pulse generator circuits 12, 13, 14, 15 and 16 successively subdivide the timing pulse signals to provide timing pulses to the successively higher order sampling circuits $S_1$, $S_2$, $S_3$, $S_4$ and $S_5$ as shown in FIG. 4. In this manner, the channel time slots are successively divided and re-divided as previously indicated. That is, the output of pulse generator 12 represents the *q* channel pulses illustrated in (E) of FIG. 2. The output of pulse generator 12 is divided by a factor O by pulse generator 13; the output of pulse generator 13 is divided by factor N of pulse generator 14; the output of pulse generator 14 is divided by factor M by pulse generator 15; and the output of pulse generator 15 is divided by factor L by pulse generator 16.

Thus, in FIG. 4 the respective voice input signals are applied to the respective input terminals of sampling circuits $s_1$ and sampled by L channel pulses of respectively different phases wherein the sampling frequency may be, for example, 8 KHz to provide a PAM output signal at the respective outputs of the sampling circuits. The respective outputs from sampling circuits $S_1$ are sampled by sampling circuits $S_2$ at a higher sampling rate, represented *Sml* time slots and the sampling continues successively at higher frequencies through sampling circuits $S_3$, $S_4$ and $S_5$. In this manner the sampled output signals from sampling circuits $S_5$ have a frequency of 8 X LMNOQ KHz, so that when the sampled output signals are assembled at the input of coder 7 there are 8 X LMNOQ KHz channels or channel time slots, each having a respectively different phase.

To decode and demodulate the transmitted signals on the receiving side, the above mentioned process may be carried out in reverse order. Bit pulses and framing pulses are synchronized with the transmitter, thereby obtaining the timing output by which decoding, group demultiplexing and channel demultiplexing can be carried out.

As is evident from the foregoing explanation, the time slot assignment is carried out in the channel unit by dividing one channel time slot within a lower ordered group or smaller multiplexed group to a larger multiplexed group in order, so that in the case of further multiplexing as, for example, in the PAM Nth stage, the PAM multiplex signals may be sampled and combined in time division by larger multiplexed group timing pulses. Furthermore, in accordance with the group construction of information of this invention, each information signal is accommodated in a group of suitable speed corresponding to the amount of information and, therefore, the transmission line can be used more effectively. Moreover, the group format construction as described above, enables less complex coder and decoder equipment to be used, whereby the coding and decoding may be accomplished in any stage to increase the general flexibility of the transmission system. Moreover, non-synchronization in the timing circuit of each pulse generator and in each repeater station will not occur while the aforesaid group formation is being carried out.

In conventional direct multiplex sampling systems, the output pulses of the channel timing pulse generator must be LMNPQ, whereas in the present invention, because the channel timing pulses are used in common for each first order group, only L output pulses need be used and therefore the entire construction of the equipment is simpler. Furthermore, in conventional systems, the channel timing pulse generator and channel sampling circuits are required to have a considerably higher speed in proportion to the number of channels that are multiplexed, whereas in accordance with the present invention, a low speed operation suffices, thereby reducing the cost of semiconductor elements and components.

The transmission loss based on the duty factor in each sampling circuit can be reduced by the apparatus of the present invention. The provision of a suitable amplifier between the sampling circuits of each stage, for example as illustrated in FIG. 4, will result in a more favorable signal-to-noise ratio, thereby reducing errors caused by noise. The flexibility of the system described in accordance with the invention is increased since the respective timing pulses from pulse timing generators 12–16 may be used to operate any number of sampling circuits for each channel of information that is to be multiplexed.

Figure 6:
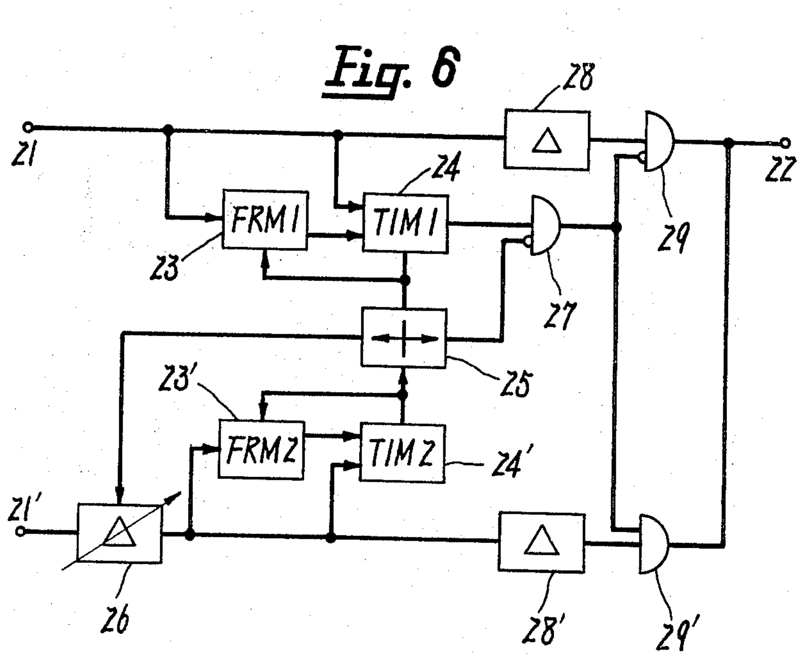
FIG. 6 illustrates a circuit for adding multiplexed groups which includes a feedback network.

FIG. 6 illustrates an embodiment of a circuit for adding groups at a given repeater station. A high ordered multiplexed group, for example, group N, is applied to input terminal 21 and a lower ordered multiplexed group, to be added to the higher ordered multiplexed group, is provided at terminal 21'. Timing generating circuit 24 extracts clock information from the multiplexed group arriving at input terminal 21 to provide timing pulses. Frame pulses which are generated at the receiving terminal by suitable equipment, are fed to framing signal detector 23 and are compared with the input pulses from input terminal 21. An out of frame situation is corrected, after a minimal delay, by transmitting shift pulses to timing pulse generator circuit 24. Similarly, framing detector 23' and time pulse generating circuit 24' will synchronize the signals received at input terminal 21'. The framing system described herein operates by one bit shifts; however, other framing systems, such as resetting systems, may be adopted in this circuitry.

Even if the system is in frame synchronization, the respective frames of the higher ordered multiplexed group and the frames of the lower ordered multiplexed group will not coincide with one another. The coincidence of the frames from both order groups is necessary so that the lower ordered group information may be inserted in the higher ordered group information. In order to accomplish the coincidence of the respective frames, the framing pulses of the higher ordered and lower ordered multiplexed group generated in timing pulse generating circuits 24 and 24' are compared in time discriminator detector 25. Automatic variable delay circuit 26 is controlled by means of a proper time constant with a time difference output signal from discriminator 25 to delay the information in the lower ordered multiplexed group to provide coincidence with the frames of the higher ordered multiplexed group.

The information to be inserted from the lower ordered multiplexed group into the higher ordered multiplexed group will be provided to timing pulse generating circuit 24 in advance and the digital information in both of these multiplexed groups will be properly delayed by fixed delay circuits 28 and 28'. The higher ordered multiplexed group information is inhibited by inhibit gate 29 in accordance with timing pulses from timing pulse generating circuit 24 which are passed through inhibit gate 27, the operation of which will be described more fully hereinafter. The lower ordered multiplexed group information is conducted by AND gate 29', and the lower ordered multiplexed information is inserted into the higher ordered multiplexed information by combining the outputs from an inhibit gate 29 and AND gate 29'. Thus, specified information from the lower ordered multiplexed group may be inserted into selected groups within the higher ordered multiplexed group in a digital form without the necessity of converting the information.

It is readily apparent that if inhibit gate 29 and AND gate 29' are operated before there is frame coincidence between the information in both groups of multiplexed information, noise will be generated in each channel and, furthermore, the information from the lower ordered multiplexed information group will not be inserted into the proper, predetermined group of the higher ordered multiplexed information. Inhibit gate circuit 27 is therefore operated by the aforementioned time difference signal from detector 25 to provide the correct operation of inhibit gate 29 and AND gate 29'. That is, inhibit gate 27 operates during those periods when there is non-coincidence between the frames of both groups of information, thereby inhibiting inhibit gate 29 and deactivating AND gate 29'. When there is frame coincidence, the inhibit signal from inhibit gate 27 is released, thereby enabling inhibit gate 29 and AND gate 29' to gate information from the respective groups in accordance with the timing signals generated by timing pulse generator 24. It is readily apparent that in the event information from either group, or both groups, is subjected to a time variation by any cause whatsoever, which thereby disturbs the frame coincidence between the information groups, the aforementioned noise will not be generated since the insertion operation will inhibited by inhibit gate circuit 27 and 29 as described above.

Time variations in the information contained in both the higher and lower ordered multiplexed groups may be caused by the deviation from the precise frequencies of the frequency dividing circuits previously described, the slow phase variation and/or fast jitter which may occur in the circuitry translating information from both groups, etc. However, the effects of such time variations will not be unduly serious if the variable range of the automatic variable delay 26 is selected to be a period of about one frame.

Figure 7:
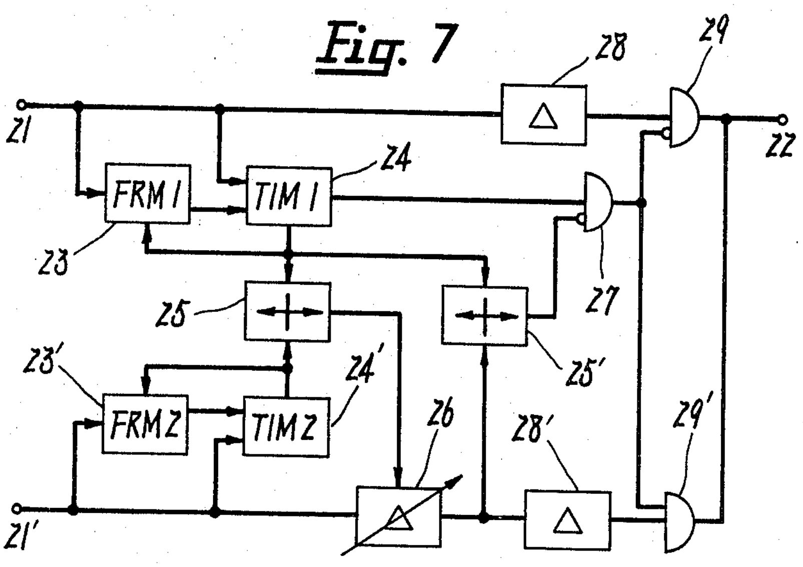
FIG. 7 illustrates a circuit for adding time multiplexed groups and which includes a feed forward loop.

The feedback system illustrated in FIG. 6 for controlling variable delay 26 may be replaced by a feed forward system as illustrated in FIG. 7. In this Figure the same numeral designations have been employed for the same circuits as illustrated in FIG. 6. In this circuit no confirmation of a mis-insertion is obtained, since the output from time discriminator 25 does not become zero. Therefore, it is necessary that the output of timing pulse generator 24 and the output of automatic variable delay circuit 26 be compared with each other by means of time discriminator 25' which performs substantially the same function as time discriminator 25. Inhibit gate circuit 27 is controlled by the output signal from time discriminator 25'. In all other respects, this circuit functions in the same manner as described above with reference to FIG. 6. Furthermore, the circuit achieves the same advantages as those of FIG. 6, namely, that in adding the information from a lower ordered multiplexed group to a specific group or groups of a higher ordered multiplexed group, no quantizing noise is generated since no coders or decoders are required.

The circuitry of FIGS. 6 and 7 for adding information may be employed in each of the group stages (A), (B), (C), etc. shown in FIG. 2. It should be further recognized that the functions of framing performed by components 23 and 23', in both FIGS. 6 and 7, may be performed by appropriate circuitry at a repeater station, thereby eliminating the necessity of these circuits in the adding circuits illustrated in FIGS. 6 and 7, and the priming pulse generators 24 and/or 24' will then be able to be used in common with the translating timing terminal pulse generating equipment.

Figure 8:
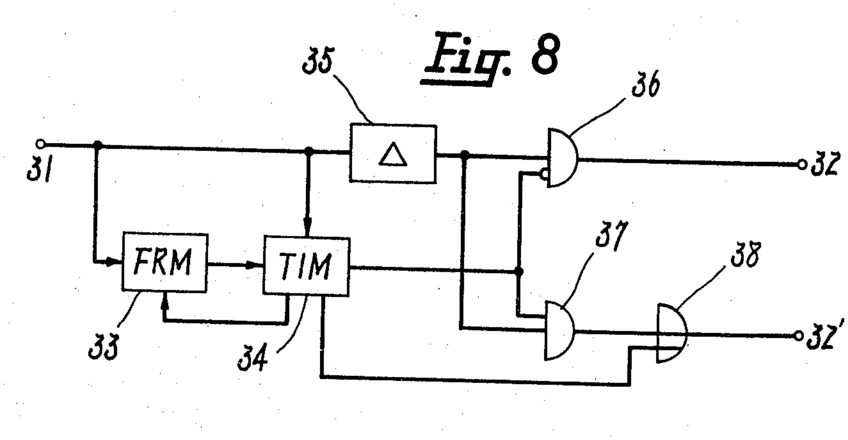
FIG. 8 illustrates a circuit for dropping time division multiplexed groups.

FIG. 8 represents an embodiment of a circuit for dropping information of a lower multiplexed order from a higher ordered multiplexed group. The higher ordered multiplexed information is provided at input terminal 31 and the remaining higher ordered multiplexed group is taken from terminal 32, while the lower ordered information dropped from the original higher ordered multiplexed group is obtained at terminal 32'. Framing synchronizing detector 33 and timing pulse generator 34 are circuits similar to framing synchronizing detector 23 and pulse timing generator 24 illustrated in FIG. 6. Pulse timing generator 34 is provided with information identifying that signal group of information which is to be dropped from the higher ordered multiplexed group which is provided to input terminals 31, and inhibit gate 36 is closed by the timing pulses from pulse timing generator 34 in order to prevent the information which is to be dropped from passing through gate 36. The timing pulses from timing generator 34, corresponding to the information in the lower ordered multiplexed group which is to be dropped, are applied to AND gate 37, thereby enabling this AND gate to pass the dropped information from the higher ordered multiplexed group to OR gate 38. It is apparent that any information contained in the higher ordered multiplexed group at terminal 31 may be dropped by supplying pulse timing generator 34 with the appropriate timing information identifying such information.

If the output of the higher ordered multiplexed group at terminal 32 has been translated into a voice frequency by appropriate circuitry in the dropping circuit, timing pulse generator 34 may be used in common with the terminal timing generating equipment. Furthermore, if the lower ordered multiplexed group, dropped from the higher ordered multiplexed group at terminal 32', is translated into a voice frequency at the dropping circuit, timing pulse generator 34 may be used in common with the timing pulse generating equipment of the terminal equipment also. It should also be recognized that, for example, as described hereinafter with reference to FIG. 12, the group adding circuitry illustrated in FIGS. 6 and 7, as well as the group dropping circuitry illustrated in FIG. 8, may be at the same location.

The dropping circuit provides the same advantage as the adding circuitry in that the information is dropped without the necessity of a decoder or coder, thereby eliminating the generation of quantizing noises, and obtaining a highly reliable circuit which is less complex than if the digital information were to be translated into, for example, a voice frequency or a PAM waveform.

In FIGS. 2 and 3, the respective channel time slots are uniformly divided in turn from lower ordered multiplexed groups to the higher ordered multiplexed groups. However, it is recognized that the respective channel time slots may be divided non-uniformly and supervising and controlling signals may then be added in the channel time slot, thereby enabling information to be added, dropped, switched or controlled as desired.

Figure 9:
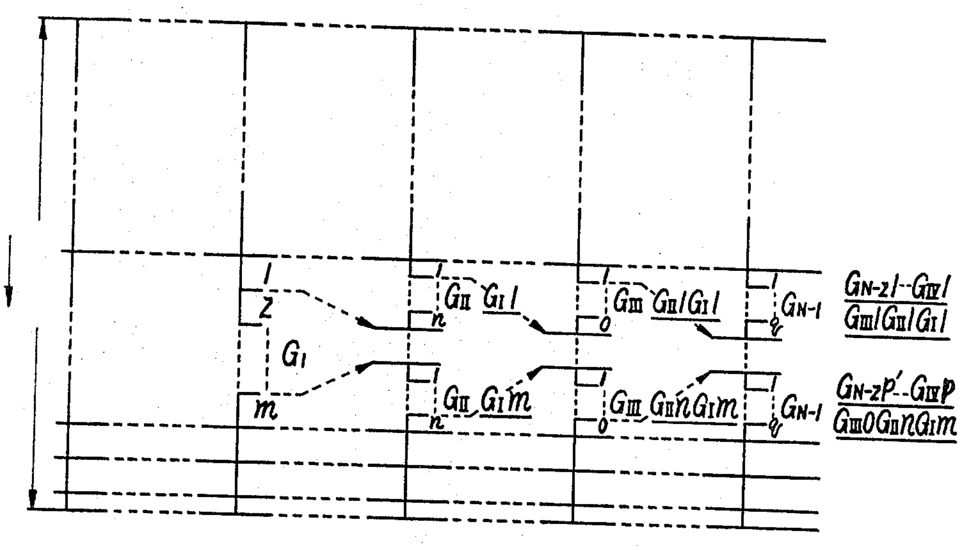
FIG. 9 illustrates the frame channel assignments used in a PCM time division multiplexing system of the link-by-link transmission line switching type.

FIG. 9 illustrates the channel assignments in the frames of a PCM time division multiplexing communication system which is used in a link-by-link transmission line switching system. In this Figure, the speech coded digits and a time slot of the framing pulse are exactly the same as those shown in FIG. 2. Two channels are provided for transmitting supervisory and controlling information signals and for transmitting group recognizing signals indicating the nature of the aforementioned signals. These channels may be added or inserted in any position in the frame. However, FIG. 9 illustrates a situation where they are provided behind the framing pulses. It is also recognized that combined use of the framing pulses and group recognizing digits is also possible. The features of the present invention may be applied to a transmission line switching system of the link-by-link transmission line type.

Figure 10:
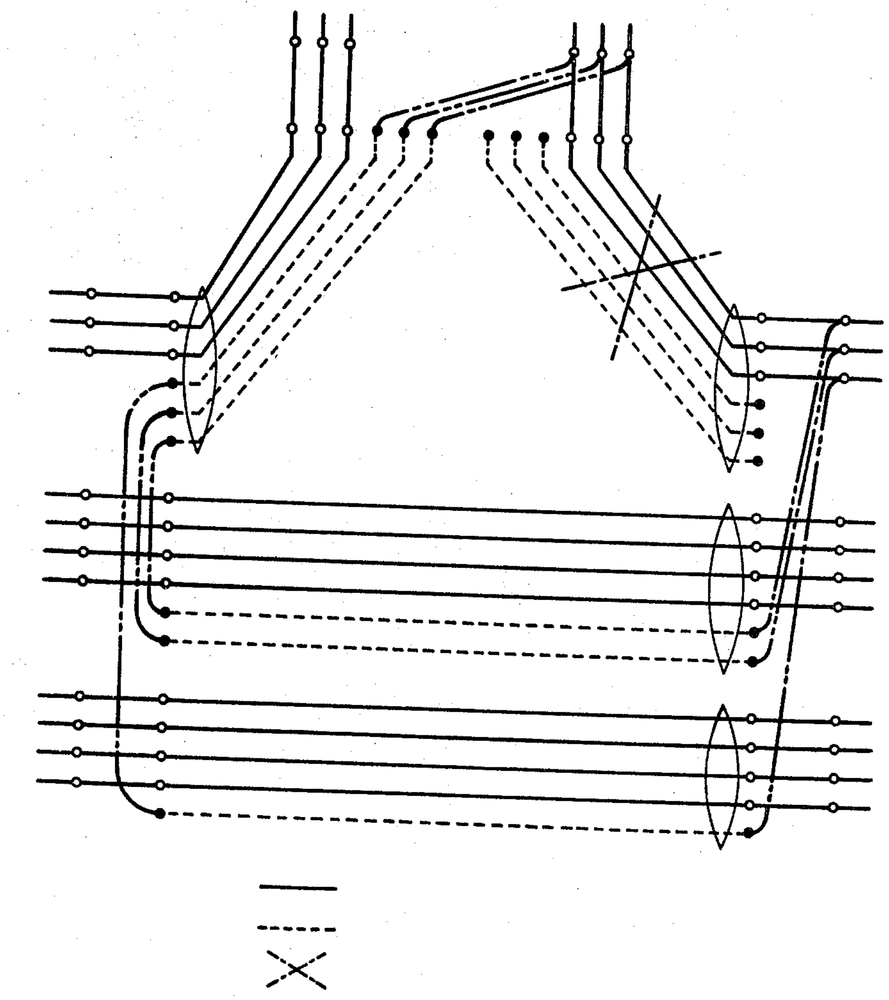
FIG. 10 illustrates a transmission network using link-by-link switching.

FIG. 10 illustrates a typical transmission network in such a link-by-link switching system. In FIG. 10, solid lines represent a normal system and the dotted lines represent an emergency system. A, B and C represent repeater stations.

Figure 11:
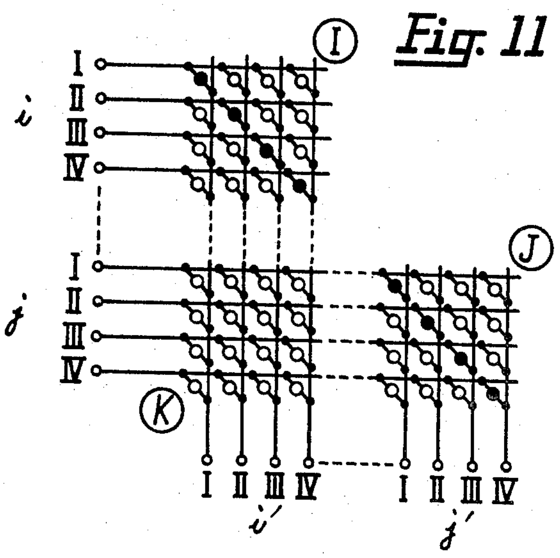
FIG. 11 illustrates a typical switching matrix for each of the stations A, B and C illustrated in FIG. 10.

FIG. 11 illustrates a switching matrix which is provided in each of the repeater stations of FIG. 10. I, II, III and IV represent system numbers for the entire route through the switching matrix. *i* represents a transmitting output terminal on the terminal equipment side of each system; *i'* represents a transmitting output terminal on the line side; *j* represents a receiving input terminal on the line side; and *j'* represents a receiving input on the terminal equipment side. The switching circuits represented by solid black dots in the matrices ⓘ and ⓙ represent circuits operating under normal conditions. The other circuits represented by white circles are operating under abnormal conditions and comprise circuits for performing group adding and group dropping functions, to be more fully described hereinafter with respect to FIG. 12. Normally, the transmitted digital outputs of the respective systems I, II, III, IV, etc., from the terminal equipment will arrive at the transmitting output terminal *i*, will pass through the matrix circuits ⓘ and will appear in the corresponding Roman Numeral systems at transmitting output terminal *i'* on the line side. The input signals of the respective systems I, II, III, IV, etc., at receiving input terminal *j* on the line side will appear in the corresponding Roman Numeral systems of the receiving input terminal *j'* on the terminal equipment side by the matrix ⓙ in the same manner.

However, in the case of a failure between, for example, stations B and C as shown by the X in FIG. 10, the system will be out of frame at the receiving input and/or the receiving pulses will not be present. If re-framing is not achieved in the normal time of about 100 – 200 milliseconds, a failure will be indicated. A failure may also be indicated, as is common in such equipment, if no pulses are received whereby in accordance with the normal pulse pattern on the line when only 50 – 60 continuous bits of information are received. In either case, in such a system as compared with, for example, a FDM system, it is possible to detect such failures within a very short time.

In response to such failure detection, switching is made through the other switching circuits represented by the circles on the diagonals of the matrix ⓘ in FIG. 11 on the transmitting side and of the matrix ⓙ on the receiving side in the stations B and C in FIG. 10. That is to say, the system I of the transmitting output terminal *i* on the terminal equipment side will be switched and connected to one or more of the systems II, III, IV, etc., of the transmitting output terminal *i'* on the line side; the system I of the receiving input terminal *j* on the line side will be switched and connected to one or more of the systems II, III, IV, etc., of the receiving input terminal *j'* on the terminal equipment side; and the other terminals will be also switched and connected in a similar manner. The details of the switching will be described hereinafter with reference to FIG. 12. If an emergency system is established in accordance with the foregoing and as illustrated in FIG. 10, the digital information will be switched and accommodated in the emergency system; and, in the case where there is no emergency switching, it may be switched and accommodated in an inactive channel group of the normal system; and, in the case where there is no inactive channel group in the normal system, a predetermined channel group normally accommodating unimportant channels may be used for the channel group information.

With reference to FIG. 10, the matrix ⓚ in FIG. 11 may be used, for example, in station A in order that signals from stations B and C may be transmitted in a digital form as they are to the stations C and B, respectively, and the digital information arriving at systems I, II, III, IV, etc., of receiving input terminal *j* on the line side is immediately connected to one or more of the systems I, II, III, IV, etc., of a transmitting output terminal *i* on the line side through the switching circuit of this matrix. If there is an emergency detected, or inactive channel group of the normal system, the digital information should be first switched to the inactive channel group. However, in the case where such a channel is not available, unimportant information channels may be set out of service and channels which have failed should be accommodated in such channels. It is therefore necessary to recognize whether each stage of a channel group is transmitting information. This may be carried out with the group recognizing digit illustrated in FIG. 9. For example, as shown in B, C, D, E and F in FIG. 9, the respective group recognizing digits are assigned in the same order as the respective channel group digits, and switching can be accomplished by the associated gate circuits operated by the output pulses of the timing pulse generating equipment, together with the corresponding channel group digits of the respective stages. Furthermore, if a plurality of group recognizing digits are assigned to each group so as to indicate the degree of importance of each channel group, the lines will be able to be automatically set out of service.

From the above description, it is evident that the diagonal switching circuits represented by the black dots of matrices ⓘ and ⓙ in FIG. 11 may be formed, for example, by simple gate circuits, as are the other switching circuits in the matrices ⓘ, ⓙ, ⓚ represented by the white dots, to operate in abnormal conditions. The functions of group information dropping and adding at such a repeater station will be described hereinafter with reference to FIG. 12.

Thus, in the present invention, the supervising channel for transmitting any failure information and the controlling channel for transmitting any switching preliminary orders or switching orders are assigned separately from the speech coded digits as shown in FIG. 9. Therefore, very flexible switching may be accomplished. Furthermore, in transmitting the above mentioned information, there will be no delay as is commonly incurred by channel band-pass filters in FDM systems and the only delay will be a line transmission delay. Failures can therefore be quickly detected to reduce the effects of service interruptions and delays. Also, as the switching is carried out in digital form, without the necessity of coders and decoders, there will be no reduction of the reliability due to the use of such equipment.

Figure 12:
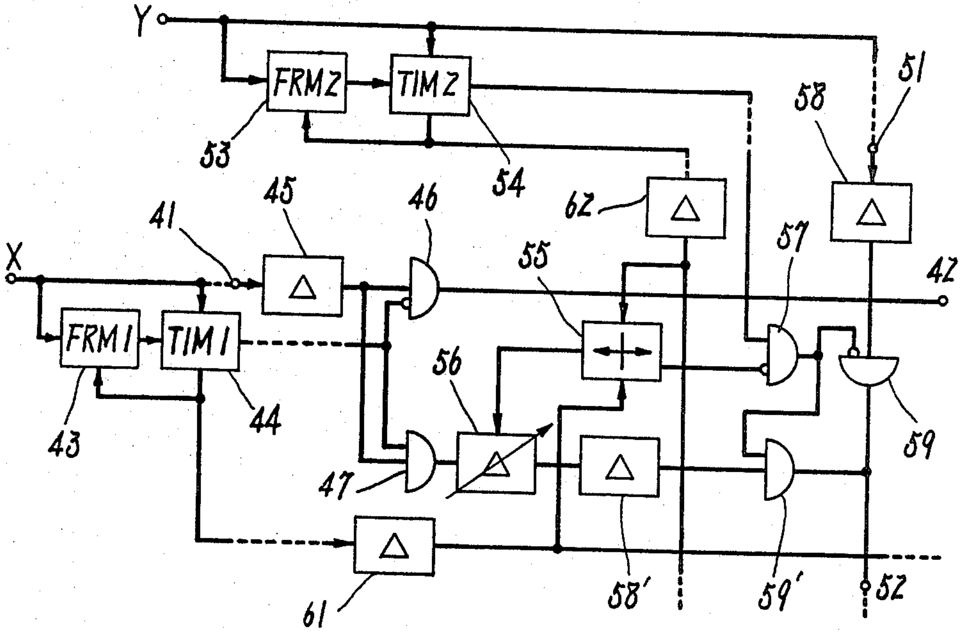
FIG. 12 illustrates an embodiment of a switching circuit of the type illustrated in FIG. 11.

In FIG. 12, X and Y correspond, respectively, to the horizontal and vertical lines of FIG. 11. X represents an input terminal of a failed system and Y represents an input terminal of an accommodating system for the failed lines. Higher ordered multiplexed information appearing at input terminal X will be brought into frame coincidence by timing pulse generating equipment 44 and framing detector 43, these circuits being similar to the respective circuits shown in FIG. 6, in accordance with the frame coincidence described with reference to that Figure. Information appearing at input terminal X is suitably delayed by fixed delay circuit 45, inhibited by inhibit gate 46 in accordance with the timing pulses from timing pulse generating circuit 44, and the information selectively passed through AND gate 47 in accordance with the information previously inserted in pulse generator 44 which information represents the group information which is to be selected from the information arriving at the terminal X.

In a similar manner, the information at input terminal Y is brought into frame coincidence by framing detector 53 and pulse generator 54. It will be apparent to those skilled in the art that such frame coincidence may also be accomplished by other systems, such as, for example, resetting systems, instead of the one-bit shifting system described herein. The circuitry illustrated in FIG. 12 provides a means for adding the information appearing at terminal X with the information appearing at terminal Y and it is therefore necessary to have the information appearing at these respective terminals in frame coincidence. Discriminator 55 and automatic variable delay circuit 56 correspond to the similar elements of FIG. 6, and the frame coincidence is carried out in the same manner as described with reference to the circuitry of FIG. 6. In accordance with such operation, the information appearing at terminal 51 is delayed by fixed delay circuits 58 and inhibited by inhibit gates 57 and 59, and simultaneously therewith, the information from variable delay circuit 56 will be delayed by a fixed amount by delay circuit 58' and selectively passed through AND gate 59' by the timing pulses from pulse generator 54, thereby providing the output information at terminal 52. Inhibit circuit 57 prevents the generation of noise by time variations of the information arriving at input terminals X and Y in a manner similar to that described with respect to inhibit gate 27 of FIG. 6. Those skilled in the art will recognize that the feedback system of FIG. 12 may be replaced by a feed forward system in the same relative sense as described previously with respect to FIGS. 6 and 7. The circuitry of FIG. 12 provides all the essential advantages previously ascribed to the circuitry of FIG. 6.

Figure 13:
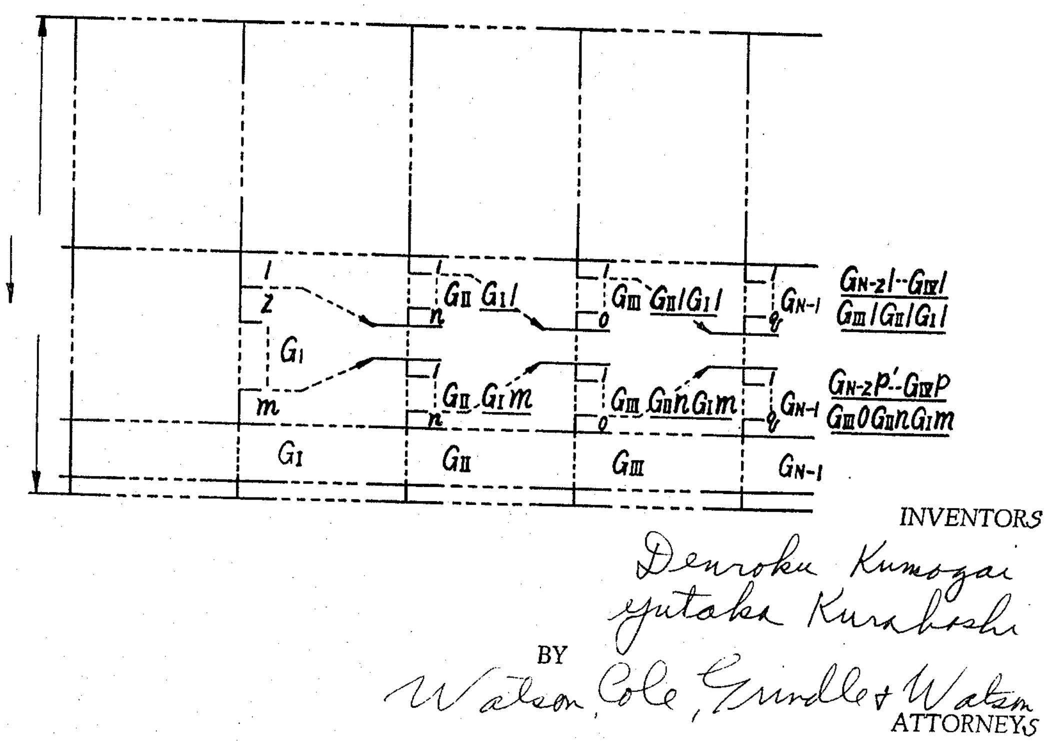
FIG. 13 illustrates the time slot assignments for a PCM time division multiplex communication system used in an end-to-end transmission line switching system.

Those skilled in the art will additionally recognize that the aforedescribed embodiments may also be incorporated in a PCM time division multiplexing communication system of the end-to-end transmission switching type. For example, both group recognizing digits indicating whether each channel group is used and the receiving office digits of each channel may be provided and such information inserted into any position in the frame. For example, the frame may be inserted after the framing pulses as illustrated in FIG. 13. FIG. 13 shows a channel assignment in a frame of a PCM time division multiplexing communication to be used in a transmission line switching system by an end-to-end relay. Both group recognizing digits indicating whether each channel group is used or not and the receiving office digits of each channel group are provided. Said digits can be inserted into any position in the frame. However, FIG. 13 shows a case where they are arranged after framing pulses. Said digits may be used also as framing pulses or the digit representing receiving office number and, further may be used also as group recognizing digits.

The end-to-end transmission switching system has the following features which are not available with the link-by-link transmission switching system. That is to say, in each of stations B and C in FIG. 10, if the above mentioned failure information is obtained, the transmitting output of the failure system will be switched so as to make a detour, for example, to the station A. According to the pattern of the receiving office digits and in the station A, the signals arriving from the stations B and C will be translated as time division digits as they are to the stations C and B, respectively. In such a situation, the transmission of supervising and controlling information between the controlling office and controlled office, such as in the link-by-link switching system, will not be required, thereby enabling a decrease in the switching time.

Figure 14:
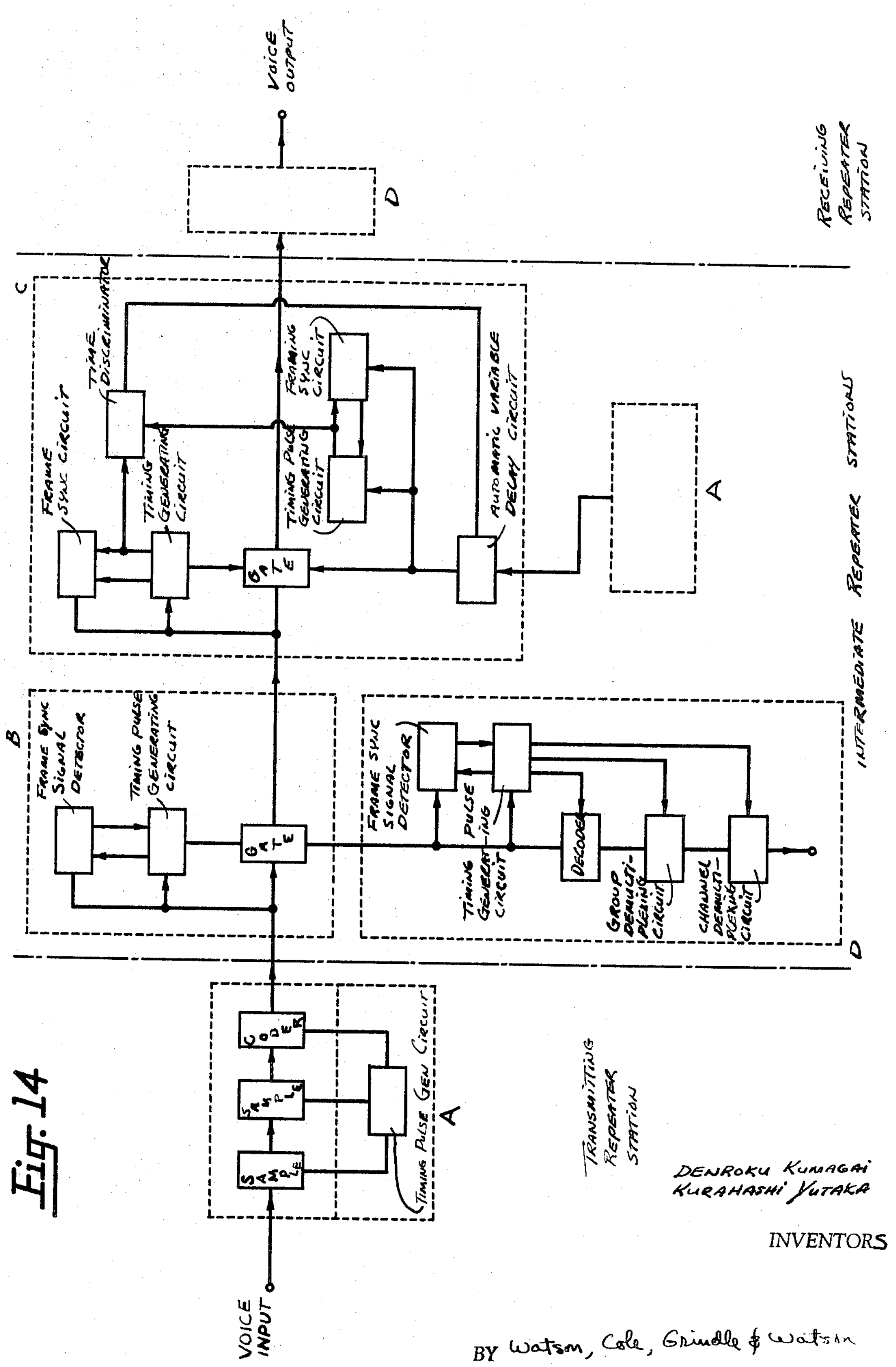
FIG. 14 is an over-all block diagram of a PCM time division multiplex communication system according to the present invention.

FIG. 14 illustrates a PCM time division multiplexing system which uses the various features of the invention. Voice input signals at T are assembled into multiplexed groups in accordance with the foregoing description by block A which includes channeling sampling circuit 60, group sampling circuit 62 and coder 64, all under the control of a timing and pulse generating circuit 66. At the output of block A, the coded voice input signals appear as a higher ordered multiplexed signal wherein each of the original channel time slots have been successively divided into smaller and smaller channel time slots as described above. The output signals are provided to channel dropping circuit B wherein frame synchronizing signal detector 33 and timing pulse generator circuit 34 have been given the same designations as the circuitry in FIG. 8. Gate circuit 68 includes the other components of FIG. 8 such as fixed delay 35, inhibit circuit 36, AND gate 37 and OR gate 38. At the output of dropping circuit B appears a higher ordered multiplexed signal from which have been dropped a selected group or portions of group information which were received as an output from transmitting device A. The output signals from gate circuit 68 enter adding circuits C in which framing synchronizing circuits 23, 23', timing generating circuits 24, 24', time discriminator 25 and automatic variable delay 26 have been given the same numeral designations as their corresponding elements in FIG. 6. Gate circuit 70 includes the remaining components of FIG. 6, such as fixed delays 28, 28', inhibit gates 27, 29 and AND gate 29'. The lower ordered multiplexed information, which is to be added to the output of gate circuit 68 by adding circuit C, is furnished by transmitting device A' through automatic variable delay circuit 26 as previously described with reference to the embodiment of FIG. 6. The higher ordered multiplexed information, which includes the lower ordered multiplexed information from transmitting device A', is converted by a receiving device D into voice output signals at terminal R in a manner which is well known to the art, and need not be described herein for the purposes of this invention. For example, receiving device D may include a framing synchronizing signal detector 72, pulse timing generating circuit 74, decoding circuit 76, group demultiplexing circuit 78 and channel demultiplexing circuit 80. It is noted that the elements of receiving device D, that is, decoder 76, group demultiplexing circuit 78 and channel demultiplexing circuit 80 appear in the reverse order as do channel sampling circuit 60, group sampling circuit 62 and coder 64 in transmitting device A. Receiving device D is illustrated in FIG. 14 as receiving an output from gate circuit 68; however, this is merely illustrated in this fashion as an example that the information may be decoded at any point within the transmission, that is, on the output of transmitting device block A to the output of dropping circuit block C. Thus, the system illustrated in FIG. 14 represents an embodiment for carrying out the various features of the aforedescribed invention.

What we claim is:

1. A multiplex communication system for assembling voice signals from a plurality of input channels into a PCM time division multiplex format consisting of successively higher ordered groups having successively higher repetition rates, comprising;

timing pulse generating means for producing a range of related different rate timing pulses, means for sampling voice frequency signals in said plurality of input information channels in accordance with the lowest rate of said timing pulses to form PAM signal waveforms, means for successively sampling the PAM signal waveforms in each channel at higher speeds in accordance with the successively higher rate timing pulses, means for assembling the sampled PAM signal waveforms into a PAM time division multiplex format, means for coding said multiplex format into a PCM format, means for adding information in a lower ordered multiplexed group to that of a higher ordered multiplexed group, means for dropping multiplex information from a higher ordered multiplexed group, and link-by-link transmission line switching means which includes said means for adding means and said means for dropping, said link-by-link transmission line switching means operating in accordance with supervising and controlling information digits indicating selected information to be added to or dropped from multiplexed information groups.

2. A multiplex communication system for assembling voice signals from a plurality of input channels into a PCM time division multiplex format consisting of successively higher ordered groups having successively higher repetition rates, comprising;

timing pulse generating means for producing a range of related different rate timing pulses, means for sampling voice frequency signals in said plurality of input information channels in accordance with the lowest rate of said timing pulses to form PAM signal waveforms, means for successively sampling the PAM signal waveforms in each channel at higher speeds in accordance with the successively higher rate timing pulses, means for assembling the sampled PAM signal waveforms into a PAM time division multiplex format, means for coding said multiplex format into a PCM format, means for adding information in a lower ordered multiplexed group to that of a higher ordered multiplexed group, means for dropping multiplex information from a higher ordered multiplexed group, end-to-end transmission line switching means wherein multiplexed information groups are transferred from an inactive or inoperative line to an active or operative line, and said multiplexed information groups including identifying information indicating selected multiplexed groups to be used.

3. A multiplex communication system for assembling voice signals from a plurality of input channels into a PCM time division multiplex format consisting of successively higher ordered groups having successively higher repetition rates, comprising;

timing pulse generating means for producing a range of related different rate timing pulses, means for sampling voice frequency signals in said plurality of input information channels in accordance with the lowest rate of said timing pulses to form PAM signal waveforms, means for successively sampling the PAM signal waveforms in each channel at higher speeds in accordance with the successively higher rate timing pulses, means for assembling the sampled PAM signal waveforms into a PAM time division multiplex format, means for coding said multiplex format into a PCM format, means for adding information in a lower ordered multiplexed group to that of a higher ordered multiplexed group and wherein said means for adding comprises;

means for detecting framing synchronization signals from said higher ordered group of multiplexed signals, means for detecting framing synchronization signals from said lower ordered group of multiplexed signals, means for generating timing pulses from said higher ordered and said lower ordered group of multiplexed signals, means for comparing said timing pulses to generate timing correction signals, means for inhibiting said higher and lower ordered groups of multiplexed signals, said inhibiting means including a first gate means responsive to said correction signals and a portion of said timing pulses to provide a timing signal, and second and third gate means for controlling the transmission of said higher and lower ordered multiplexed signal groups, respectively, in accordance with said timing signal whereby said higher and lower ordered multiplexed signal groups are combined into one multiplexed signal group.

4. A multiplex communication system for assembling voice signals from a plurality of input channels into a PCM time division multiplex format consisting of successively higher ordered groups having successively higher repetition rates, comprising;

timing pulse generating means for producing a range of related different rate timing pulses, means for sampling voice frequency signals in said plurality of input information channels in accordance with the lowest rate of said timing pulses to form PAM signal waveforms, means for successively sampling the PAM signal waveforms in each channel at higher speeds in accordance with the successively higher rate timing pulses, means for assembling the sampled PAM signal waveforms into a PAM time division multiplex format, means for coding said multiplex format into a PCM format, means for dropping multiplex information from a higher ordered multiplexed group, and wherein said means for dropping comprises;

means for detecting framing signals from a first group of multiplexed signals, means for generating timing pulses from said framing signals and said first group of multiplexed signals, means for selectively inhibiting portions of said first group of multiplexed signals, said inhibiting means including a first gate means controlled by said timing pulses to transmit a selected portion of said first group of multiplexed signals, said inhibiting means further including second gate means responsive to said timing pulses to transmit additional selected portions of said first group of multiplexed signals whereby said first group of multiplexed signals is divided into second and third groups of multiplexed signals and said first group is of a higher order than said second and third groups of multiplexed signals.

5. A multiplex communication system in accordance with claim 3 further comprising additional means for generating additional timing pulses, said additional means being responsive to a portion of said timing pulses and to the delayed second group of multiplexed signals, and said additional timing pulses controlling said first gate means.

6. A multiplex communication system according to claim 3 further comprising additional means for selectively inhibiting portions of said higher ordered group of multiplexed signals, said inhibiting means including a fourth gate means controlled by said timing pulses to transmit a selected portion of said higher ordered group of multiplexed signals, said inhibiting means further including additional gate means responsive to said timing pulses to transmit additional selected portions of said higher ordered group of multiplexed signals whereby said higher ordered group of multiplexed signals is divided into two different groups of multiplexed signals.

7. A multiplexing system as in claim 1 wherein said means for switching comprises;

means for detecting framing synchronization signals from a first group of multiplexed signals, means for detecting framing synchronization signals from a second group of multiplexed signals, means for generating timing pulses from the second framing synchronization signals, means for gating selected portions of said second multiplexed signals in accordance with said timing pulses, additional means for generating additional timing pulses from the first framing synchronization signals, means for delaying the gated portions of said second multiplexed signals, means for comparing said timing pulses and said additional timing pulses to generate control signals for adjusting said means for delaying said second group of multiplexed signals, and means for controlling the transmission of multiplex signals including selected portions of said first and said second multiplexed signals in accordance with said control signals.

* * * * *